United States Patent [19]

Hasegawa

[11] Patent Number: 5,142,940
[45] Date of Patent: Sep. 1, 1992

[54] VEHICLE TRANSMISSION ASSEMBLY

[75] Inventor: Toshiyuki Hasegawa, Ashiya, Japan

[73] Assignee: Kanzaki Kokyukoki Mfg. Co., Ltd., Japan

[21] Appl. No.: 699,904

[22] Filed: May 14, 1991

[30] Foreign Application Priority Data

May 28, 1990 [JP] Japan .............................. 2-55668[U]

[51] Int. Cl.$^5$ ...................... F16H 57/02; F16D 39/00; F01B 3/00; B60K 17/28
[52] U.S. Cl. ........................... 74/606 R; 74/730.1; 60/487; 180/53.1; 92/12.2
[58] Field of Search ........................... 74/606 R, 730.1; 475/72; 60/487, 489, 490, 464, 455; 180/305, 307, 53.1, 53.4; 92/12.2, 57, 71

[56] References Cited

U.S. PATENT DOCUMENTS

| | | | |
|---|---|---|---|
| 4,579,183 | 4/1986 | Irikura et al. | 180/53.1 |
| 4,781,022 | 11/1988 | Hayashi et al. | 60/490 X |
| 4,815,288 | 3/1989 | Yamaguchi | 60/487 X |
| 4,856,279 | 8/1989 | Kawahara et al. | 60/489 |
| 4,860,540 | 8/1989 | Hayashi et al. | 60/487 |
| 4,875,390 | 10/1989 | Hayashi et al. | 60/487 X |
| 4,880,070 | 11/1989 | Irikura | 180/53.1 |
| 4,896,506 | 1/1990 | Shivvers et al. | 92/12.2 X |
| 4,914,907 | 4/1990 | Okada | 180/53.1 X |
| 4,916,901 | 4/1990 | Hayashi et al. | 92/12.2 X |
| 4,922,715 | 5/1990 | Furumoto et al. | 60/487 X |
| 5,070,696 | 12/1991 | Atake | 60/489 X |

FOREIGN PATENT DOCUMENTS

| | | |
|---|---|---|
| 52-91503 | 7/1977 | Japan . |
| 58-43524 | 3/1983 | Japan . |
| 61-30124 | 2/1986 | Japan . |
| 61-81427 | 5/1986 | Japan . |

Primary Examiner—Vinh T. Luong

[57] ABSTRACT

In a transmission assembly comprising a transmission casing (11) disposed between left and right rear wheels (13) and a hydrostatic transmission (16) supported by a plate member (15) secured to a front of the transmission casing, an axial plunger-type hydraulic pump (17) of the hydrostatic transmission is mounted on a rear of an upper portion of the plate member and is disposed within the transmission casing. One of the side walls (11a) of the transmission casing includes an opening (24) for assembling into the casing not only a transmission mechanism disposed between a laterally extending reduction shaft (20), driven by a motor shaft (18a) of the hydrostatic transmission, and rear wheel axles (12), but a swash plate (23) of the hydraulic pump. A side cover (25) which closes the opening is used for supporting the transmission mechanism and swash plate so as to permit to assemble the swash plate into the transmission casing together with the transmission mechanism.

3 Claims, 6 Drawing Sheets

VEHICLE TRANSMISSION ASSEMBLY

FIELD OF THE INVENTION

This invention relates to a vehicle transmission assembly adapted for use in tractors and the like and having a hydrostatic transmission for changing the vehicle speed non-stepwisely.

BACKGROUND OF THE INVENTION

In a case where a hydrostatic transmission of the function set forth above is provided in a vehicle in which axles of left and right rear wheels are supported rotatably by a transmission casing disposed between the left and right rear wheels, a structure is often employed in which a hydraulic pump and a hydraulic moter of the hydrostatic transmission are disposed, as shown in U.S. Pat. Nos. 4,579,183, 4,880,070 and JP, U No. 61-81427, at a higher level and at a lower level respectively on a plate member which is secured to a front of the transmission casing so as to close an opening in a front wall of the casing. This structure permits to dispose a pump shaft of the hydraulic pump at a level approximately equal to that of a front-mount engine output shaft from which driving power is transmitted to the pump shaft. A motor shaft of the hydraulic motor is also located at a level such that a transmission mechanism for transmitting power from the motor shaft to the rear wheel axles of a low level can be arranged within the transmission casing in a compact fashion. Further, fluid passages and valves for the hydrostatic transmission may be disposed within the plate member.

In a transmission assembly having such hydrostatic transmission according to the prior art, both of the hydraulic pump and hydraulic motor of the hydrostatic transmission are disposed, as shown in the three prior art literatures set forth above, on a front of the plate member and are housed in a cup-shaped casing which is secured to the front of the plate member. Consequently, the hydrostatic transmission is fashioned to a unit structure using the plate member as its support so that it may easily be preassembled and may easily be assembled into a vehicle.

On the other hand, the casing which houses even the hydraulic pump of a high level and is correspondingly large-sized may result in a bad condition for feet of an operator sitting on a seat. The large-sized casing on the plate member may also make it impossible to dispose a fluid-supplementing charge pump for the hydrostatic transmission directly on the plate member in a fashion such that an output port of the charge pump is connected directly to a fluid passage in the plate member.

Further, the cup-shaped casing having a rear end opening will make it troublesome to assemble a swash plate for the hydraulic pump of a variable displacement type. That is, such casing has at its both sides integral side walls so that a swash plate having left and right support shafts previously attached to it cannot be assembled into the casing. Consequently, a very troublesome assembling procedure must be taken in that a pair of separately formed support shafts are inserted into the casing through a pair of thorough bores in the side walls of the cup-shaped casing and are secured to a swash plate which has previously been kept at its required position within the casing as shown, for example, in JP, U No. 52-91503.

Accordingly, a primary object of the present invention is to provide a novel and improved transmission assembly in which a plate member secured to a front of a transmission casing is employed for supporting a hydrostatic transmission in a fashion so as to provide a large open space before the plate member and so as to permit an easy assembling procedure for a swash plate whereby the problems set forth above are eliminated without sacrificing an easiness of assembling procedure for the hydrostatic transmission itself.

An attendant object of the present invention is to provide an improved vehicle transmission assembly in which a spring mechanism for returning the swash plate to its neutral position is arranged, by utilizing a structure for achieving the primary object set forth above, within a transmission casing so as to assure a smooth operation of the mechanism for a lengthened period of time as compared to a prior art structure in which such spring mechanism is arranged at an outside of a transmission casing, as shown, for example, in JP, U No. 58-43524 and JP, U No. 61-30124.

BRIEF DESCRIPTION OF THE DRAWINGS

Other objects and advantages of the invention will become readily apparent as the specification is considered in conjunction with the accompanying drawings in which.

SUMMARY OF THE INVENTION

Figure 1:
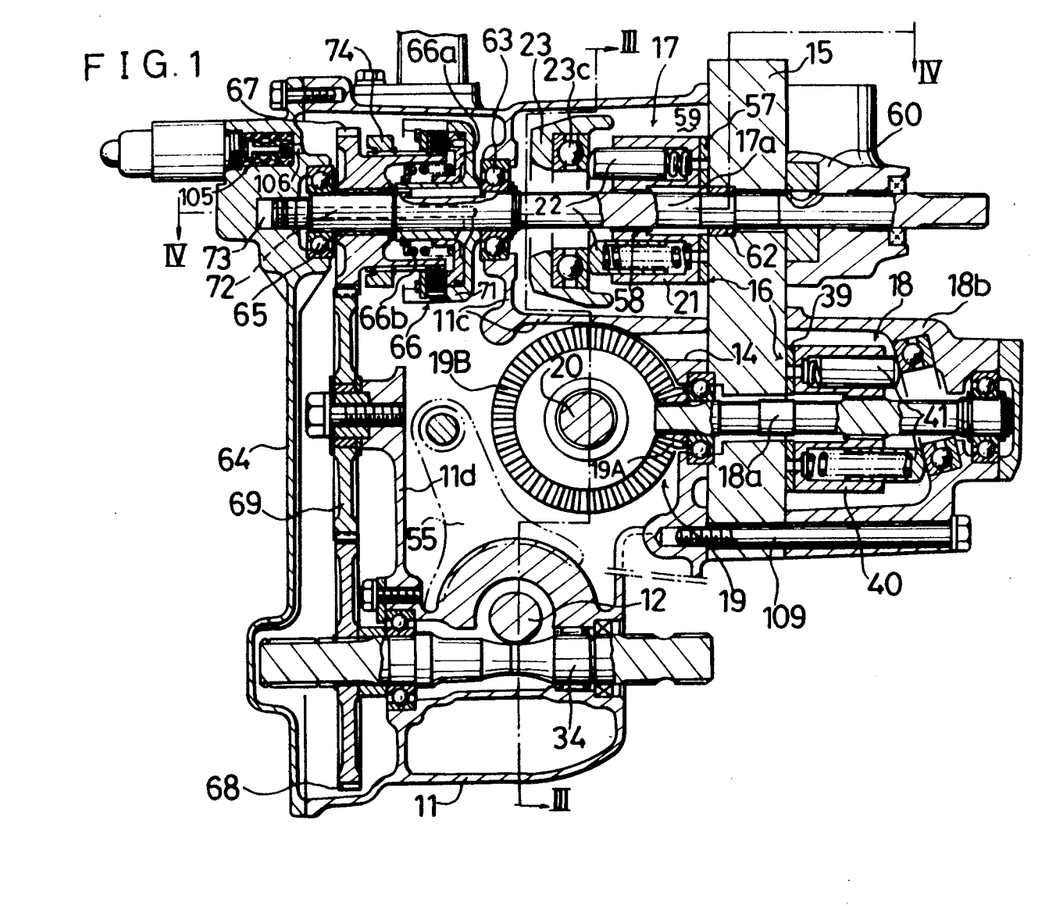
FIG. 1 is a sectional side view, partially developed, of an embodiment of the vehicle transmission assembly according to the present invention.
Figure 2:
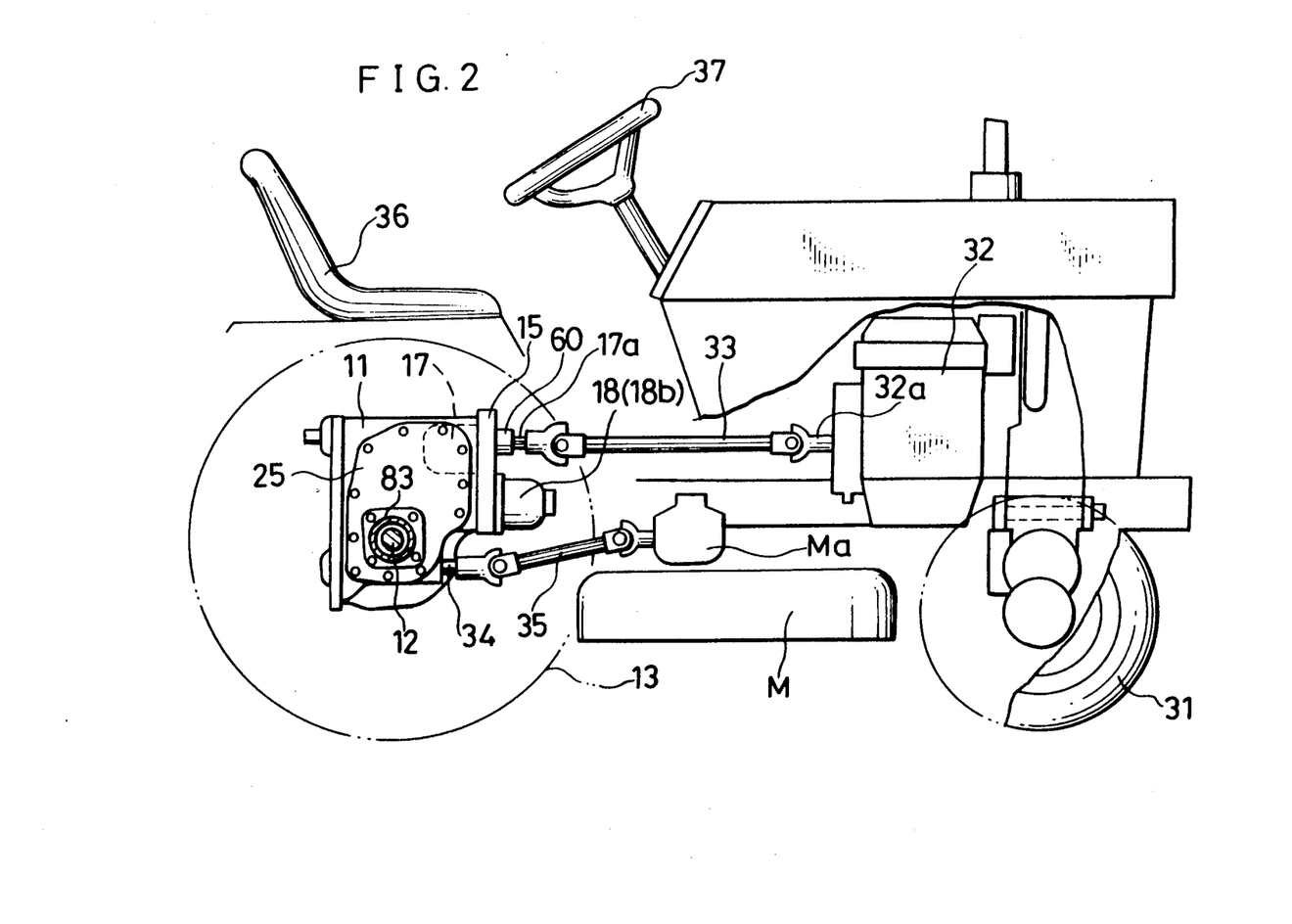
FIG. 2 is a schematic side view, partially cut away and partially in section, of a mower tractor in which the transmission assembly shown in FIG. 1 is employed.

The present invention relates to a vehicle transmission assembly in which axles 12 of left and right rear wheels 13 are supported rotatably, as shown in FIGS. 1 and 2, by a transmission casing 11 which is disposed between the left and right rear wheels 13. The transmission assembly further includes a hydrostatic transmission 16 for changing the vehicle speed non-stepwisely. This hydrostatic transmission is provided using as a support a plate member 15, which is secured to a front of the transmission casing 11 so as to close an opening 14 in a front wall of the casing 11, and comprises a hydraulic pump 17 and hydraulic motor 18 which are disposed respectively on the plate member 15 such that the hydraulic punp 17 is positioned at a higher level than the hydraulic motor 18.

Figure 3:
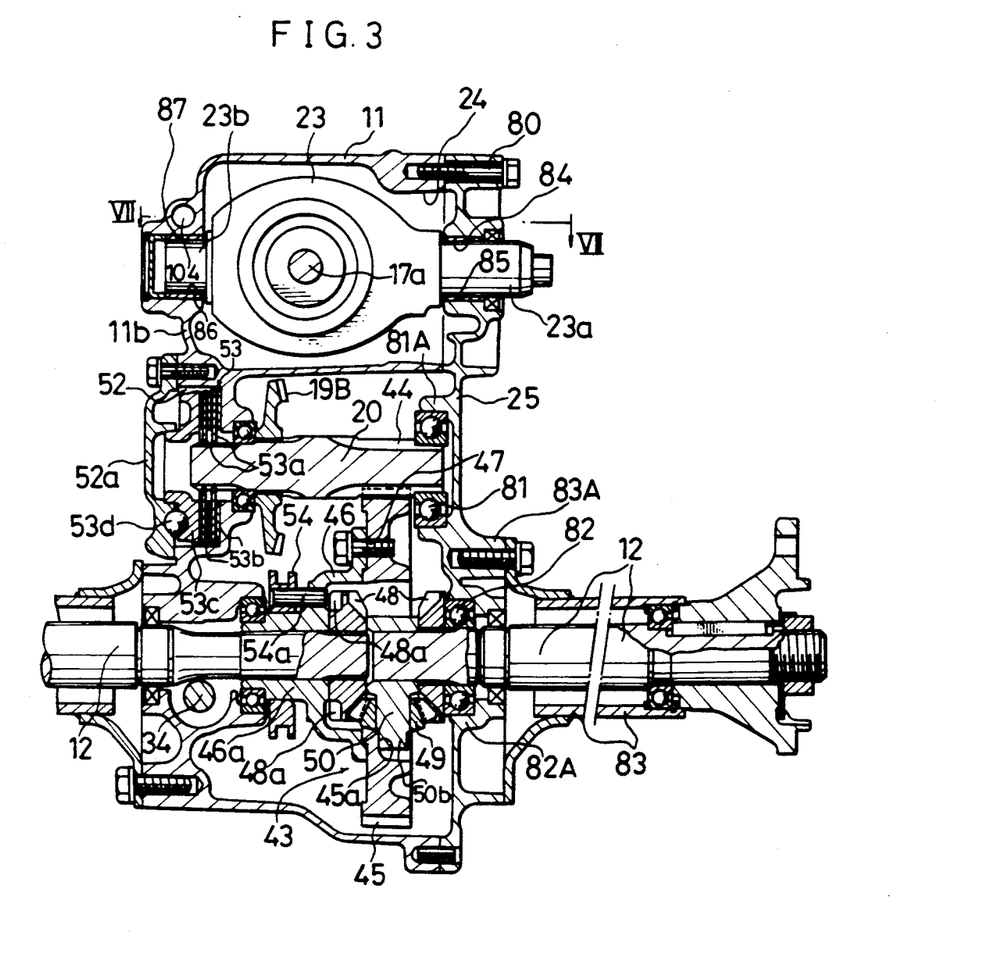
FIG. 3 is a sectional view, partially cut away, taken generally along line III—III of FIG. 1.

As shown in FIGS. 1 to 3, the hydraulic motor 18 is disposed, according to the present invention, on a front of the plate member 15 and includes a motor shaft 18a drivingly connected through a speed-reducing bevel gearing 19 to a speed-reduction shaft 20 which is disposed within the transmission casing 11 and extends laterally of the casing. The left and right rear wheel axles 12 are drivenly connected to the speed-reduction shaft 20.

Figure 4:
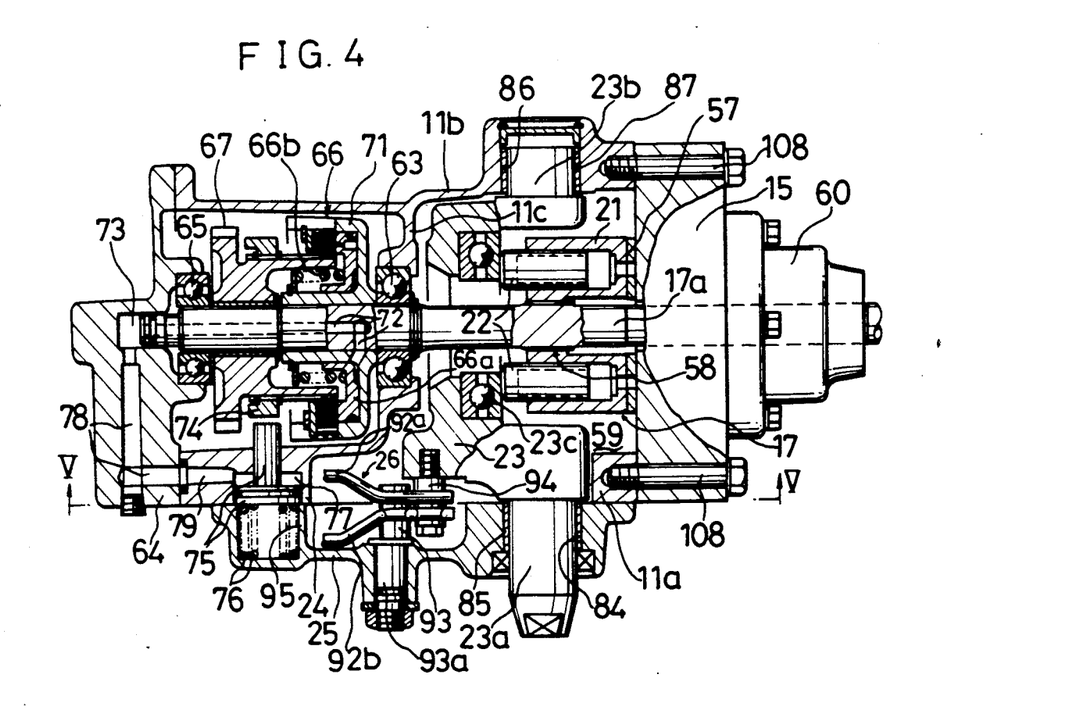
FIG. 4 is a sectional view taken generally along line IV—IV of FIG. 1.

As shown in FIGS. 1 and 4, the hydraulic pump 17 is disposed within the transmission casing 11 and is fashioned to an axial plunger-type pump. This axial plunger-type pump 17 includes a pump shaft 17a which is supported rotatably by the plate member 15, a cylinder block 21 which is disposed on a rear of the plate member 15 and is fixedly mounted on the pump shaft 17a, plural plungers 22 which are disposed slidably in the cylinder block 21 and extends rearwardly from the cylinder block, and a tiltable swash plate 23 which is disposed rearwardly of the cylinder block 21. The plungers 22 engage the swash plate 23.

Figures 5, 6:
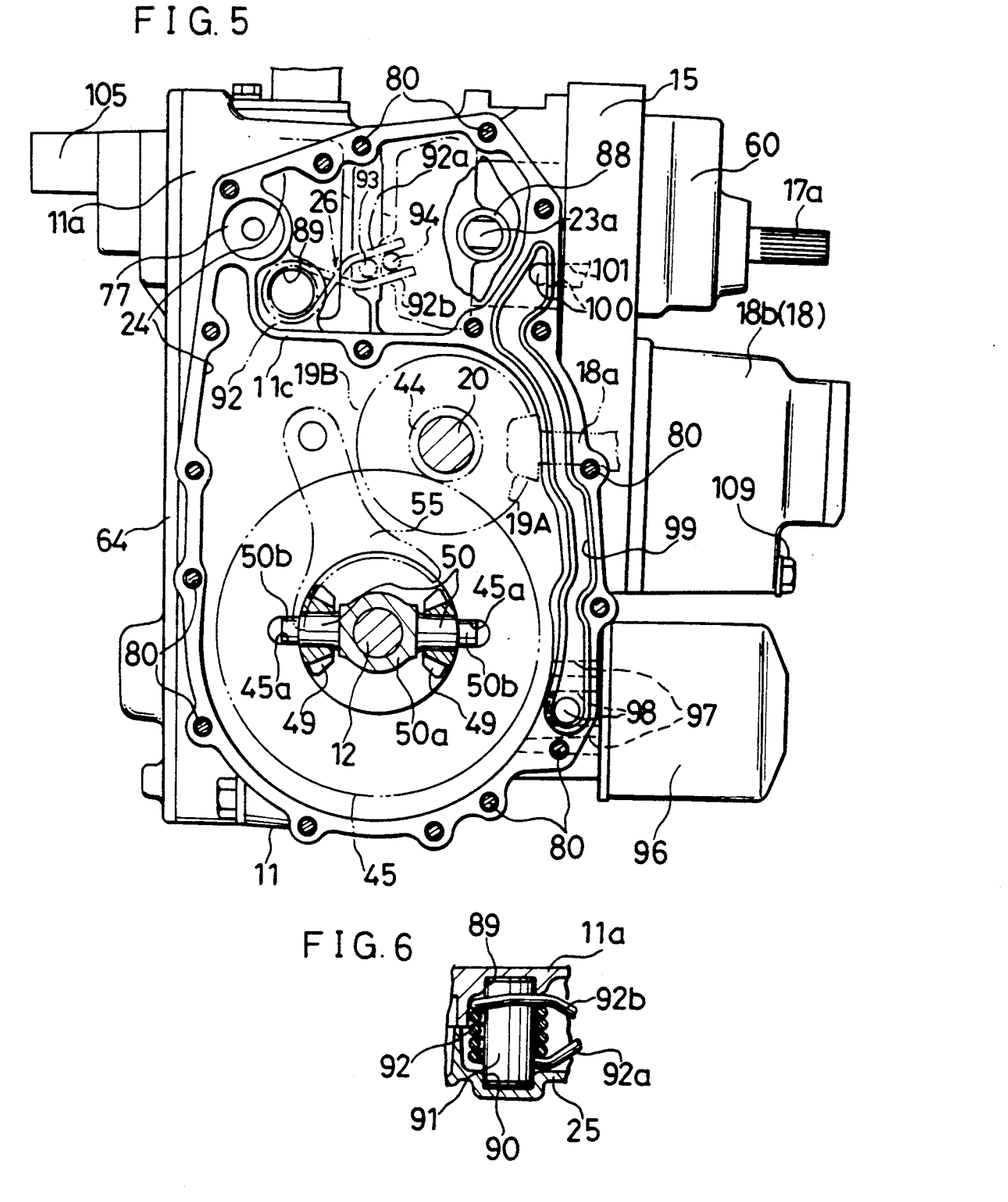
FIG. 5 is a sectional view taken generally along line V—V of FIG. 4.
FIG. 6 is a sectional plan view showing a part of the transmission assembly shown in FIG. 1.

As shown in FIGS. 3 to 5, a second opening 24 is formed in one of side walls 11a of the transmission casing 11 for assembling a transmission mechanism which is to be disposed between the speed-reduction shaft 20 and the left and right rear wheel axles 20. This opening 24 is particularly fashioned such that it extends upwardly so as to permit therethrough to assemble the swash plate 23 into the transmission casing 11. Left and right support shafts 23a and 23b of the swash plate 23 are rotatably supported by the other side wall 11b of the transmission casing 11 and by a side cover 25 which is secured to an outer surface of the former side wall 11a so as to close the opening 24.

In a preferred embodiment of the present invention, a spring mechanism 26 for returning the swash plate 23 to its neutral position is disposed, as shown in FIGS. 4 to 6, within the transmission casing 11 and is supported by the side wall 11a and by the side cover 25.

Figure 8:
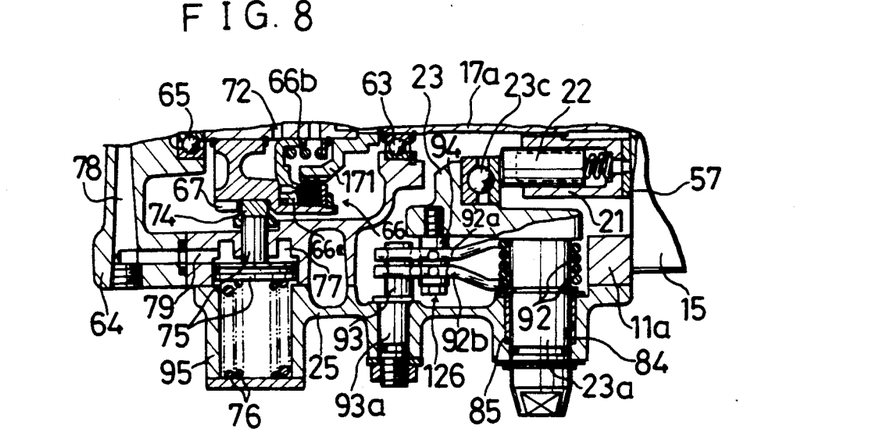
FIG. 8 is a cross-sectional view of a part of a second embodiment of the vehicle transmission assembly according to the present invention.

In another preferred embodiment of the present invention, an alternative spring mechanism 126 is disposed, as shown in FIG. 8, within the transmission casing 11 and is supported by a portion of the support shaft 23a which portion is located between the swash plate 23 and the side cover 25.

Because the hydraulic pump 17 is disposed on a rear of the plate member 15 such that the cylinder block 21 of the pump is supported by the plate member 15 through the pump shaft 17a, and because the hydraulic motor 18 is disposed or mounted on a front of the plate member 15 in a fashion same as the case of the prior art structure set forth before, the hydrostatic transmission 16 employed in the transmission assembly is also fashioned to a unit structure using the plate member 15 as its support so that it may easily be pre-assembled and may easily be assembled into a vehicle.

Because the speed-reduction shaft 20 which is driven to rotate by the motor shaft 18a with a reduced speed of rotation through the bevel gearing 19 is disposed so as to extend laterally of the transmission casing 11 in a parallel relationship with the rear wheel axles 12, the transmission mechanism to be disposed between the reduction shaft 20 and rear wheel axles 12 is to be fashioned such that it uses both of the side walls 11a and 11b of transmission casing 11 as its shaft-supporting structural elements. In the transmission assembly according to the present invention, one of the side walls 11a includes for assembling such transmission mechanism into the transmission casing 11 and opening 24, which is closed by the side cover 25 secured to the side wall 11a, so that the side cover 25 is used as a shaft-supporting structural element of one side. According to the present invention, the opening 24 is fashioned to extend upwardly so as to permit to assemble the swash plate 23 of pump 17 into the casing 11 through the opening 24 and support shafts 23a and 23b of the swash plate are supported by the side cover 25 and by the side wall 11b of the other side. This structure permits a very easy assembling procedure of the swash plate 23. That is, the support shafts 23a and 23b may previously be secured to the swash plate 23 and the swash plate may then be located within the transmission casing 11 in a condition such that one of the support shafts 23b is supported by the side wall 11b, and then the other support shaft 23a may be supported by the side cover 25 when this cover is placed and secured onto the outer surface of the side wall 11a. In an alternative assembling procedure, the swash plate 23 may previously be supported by the side cover 25 through one of the support shafts 23a and then, at the same time when the side cover is placed and secured onto the outer surface of the side wall 11a, the swash plate 23 may be assembled into the transmission casing 11 such that the other support shaft 23b is supported by the side wall 11b. In any of these assembling procedure, the transmission mechanism between the speed-reduction shaft 20 and rear wheel axles 12 is assembled into the transmission casing 11 together with the swash plate 23. It is thus seen that assembling procedure of the transmission assembly may be carried out with ease as a whole.

Because the cylinder block 21 of the hydraulic pump 17 is disposed on the rear of the plate member 15, fluid passages may be formed in the plate member 15 such that they are communicated directly with fluid passages in the cylinder block 21. Because the hydraulic pump 17 is disposed within the transmission casing 11 by utilizing this casing as a casing for the pump so that only a small-sized casing for the hydraulic motor 18 may satisfactorily be mounted on the front surface of the plate member 15, a large open space is provided before the plate member 15. Such large open space will offer a good condition for feet of an operator of the vehicle and also will permit to mount a charge pump for supplementing fluid to the hydrostatic transmission 16 on the front surface of plate member 15 in a fashion such that inlet and outlet ports of the charge pump are communicated directly with fluid passages in the plate member 15 so as to simplify the fluid passage structure.

In a case where a spring mechanism 26 for returning the swash plate 23 to its neutral position is disposed within the transmission casing 11 using one of the side walls 11a of transmission casing and the side cover 25 attached to this side wall as supports for the spring mechanism, the spring mechanism 26 is well protected by the transmission casing 11 from causing rust and from taking-in foreign matters so that a smooth operation of this mechanism 26 of returning the swash plate automatically to its neutral position is assured for a long period of time.

In a case where a spring mechanism 126 of the same function is disposed within the transmission casing 11 and between the swash plate 23 and side cover 25 using one of the support shafts 23a as a support of the spring mechanism, an advantage other than the advantage set forth above is additionally given in that the spring mechanism 126 may be assembled into the transmission casing at an inner side of the side cover 25 together with the assembling of swash plate 23 into the transmission casing 11.

DESCRIPTION OF PREFERRED EMBODIMENTS

A mower tractor is shown in FIG. 2 in which an embodiment of the transmission assembly according to the present invention is employed. The tractor is equipped with a mid-mount mower M at an underside of the vehicle and between pairs of front wheels 31 and rear wheels 13.

An engine 32 is mounted on a front portion of the vehicle and includes an output shaft 32a extending rearwardly from it. The pump shaft 17a referred to before extends forwardly through the plate member 15 and is powered by the engine output shaft 32a through a transmission shaft 33. A mid-PTO shaft 34 extends forwardly from a lower portion of the transmission casing 11 and is adapted to transmit mower-driving power to a gear box Ma of the mower through a transmission shaft 35. An operator's seat 36 is disposed above the transmission casing 11, and a steering wheel 37 for operating the left and right front wheels 31 to turn is located before the seat 36.

As shown in FIG. 1, the hydraulic motor 18 of the hydrostatic transmission 16 refered to before is housed in a cup-shaped casing 18b which is fixedly mounted on a front surface of the plate member 15. This hydraulic motor 18 is fashioned to an axial plunger motor of a fixed displacement type in which a cylinder block 40 is fixedly mounted on the motor shaft 18a and is in a slidable engagement with a fixed valve plate 39 on the plate member 15 and in which plural plungers 41 are slidably disposed in the cylinder block 40 and extend forwardly from this block. The motor shaft 18a extends through the plate member 15 into the transmission casing 11 and fixedly carries a bevel pinion 19A spline-fitted on it. The bevel gearing 19 set forth before is composed of this bevel pinion 19A and a bevel gear 19B which is fixedly mounted on the speed-reduction shaft 20, referred to before, and meshes with the bevel pinion.

As shown in FIG. 3, a differential gearing 43 is disposed between the left and rear wheel axles 12 and includes an input gear 45 meshing with a smaller gear 44 which is formed integrally with the reduction shaft 20. The input gear 45 is secured, using bolts 47, to a generally cup-shaped differential carrier 46 which is rotatably mounted at its boss portion 46a on the wheel axle 12 of one side. In the differential gearing 43, a pair of drive pinions 49 meshing with a pair of driven pinions 48 on the wheel axles 12 are mounted on a pinion shaft 50 which is rotatably mounted, as shown in FIG. 5, at its central boss portion 50a on the wheel axle 12 of the other side and is fitted at its diameter-reduced end portions 50b into recesses 45a in the boss portion of input gear 45 so as to rotate together with the input gear 45.

As shown in FIG. 3, the reduction shaft 20 extends at its one end into a brake chamber 52 which is formed at an outer side of the side wall 11b of transmission casing 11. A brake 53 is disposed within the brake chamber 52 and is fashioned to a frictional disc-type brake having opposite sets of frictional elements 53a and 53b which are slidably but non-rotatably supported by the reduction shaft 20 and by the side wall 11b. The brake chamber 52 is closed by a cover member 52a, and the brake 53 further includes a pressure plate 53c which is slidably and rotatably guided by the cover member 52a, and a plurality of balls 53d which are disposed within a plurality of cam grooves formed between the pressure plate 53c and cover member 52a and are operable, when the pressure plate 53c is rotationally displaced, to push the pressure plate so as to actuate the brake 53. A differential-locking clutch 54 is slidably disposed on the boss portion 46a of differential carrier 46 and carries a lock pin 54a which is projected selectively into one of circumferentially spaced recesses 48a in the boss portion of the driven pinion 48 of one side for releasing the function of the differential gearing 43. In FIGS. 1 and 5, numeral 55 designates a clutch fork for operating the differential-locking clutch 54.

As shown in FIGS. 1 and 4, the cylinder block 21 of the hydraulic pump 17 is disposed so as to be in a slidable engagement with a valve plate 57 secured to a rear surface of the plate member 15 and is fixedly mounted on the pump shaft 17a using a splined connection 58. Plural plungers 22 which extend rearwardly from the cylinder block 21 engage a bearing 23c which is carried by the swash plate 23. A partition wall portion 11c extends integrally from the inner wall of the transmission casing 11 so as to define, in co-operation with the plate member 15 and side cover 25, a chamber 59 which reserves oil for lubricating and cooling the hydraulic pump 17. A charge pump 60 for supplementing fluid to the hydrostatic transmission 16 is mounted on a front surface of the plate member 15. This charge pump 60 is fashioned to a trochoid-type pump using, as its pump shaft, the pump shaft 17a of hydraulic pump 17 which extends forwardly through the plate member 15 and is connected to the transmission shaft 33 shown in FIG. 2.

As also shown in FIGS. 1 and 4, the pump shaft 17a, which is supported by the plate member 15 and by a vertically extending portion of the partition wall 11c respectively through bearings 62 and 63, extends further rearwardly from the partition wall 11c and has a rear end portion which is supported by a rear cover 64, closing a rear end opening of the transmission casing 11, through a bearing 65. On a rearer portion of this pump shaft 17a are mounted a PTO clutch 66 and a freely rotatable gear 67 which is coupled selectively to the pump shaft by the clutch 66. The gear 67 is co-rotatably connected to a gear 68, fixedly mounted on a rear end portion of the mid-PTO shaft 34, through an intermediate idler gear 69 which is supported by a support wall 11d extending upwardly from an inner bottom of the transmission casing 11. The mid-PTO shaft 34 is supported by the support wall 11d and by a front wall of the transmission casing and extends forwardly from the casing 11.

The PTO clutch 66 set forth above is fashioned to a fluid-operated frictional clutch comprising opposite sets of frictional elements which are slidably but non-rotatably supported by a clutch housing 71, fixedly mounted on the pump shaft 17a, and by the gear 67. As is usual, the fluid-operated PTO clutch 66 further comprises an annular piston 66a which is disposed within the clutch housing 71 and is biased to move away from the frictional elements by a return spring 66b. The clutch 66 is engaged by fluid under pressure, supplied through a fluid passage 72 in the pump shaft 17a, which causes the piston 66a to move toward the frictional elements against the biasing force of return spring 66b. The fluid passage 72 is communicated at its rear end to a fluid chamber 73 in the rear cover 64. A brake is provided which comprises a brake shoe 74 pressingly engageable with a boss portion of the gear 67 for braking the driven side of clutch 66 so as to prevent an inertial rotation at a disengaged condition of the clutch 66. A piston-piston rod 75 for providing a pressing operation to the brake shoe 74 is fittingly received in a cylinder bore in the side wall 11a of the transmission casing 11. As shown in FIG. 4, the piston-piston rod 75 is biased to move toward the brake shoe 74 by a pair of coil springs 76, and a fluid chamber 77 for applying fluid pressure against the biasing force of springs 76 is provided by an inner side of the cylinder bore referred to above. This fluid chamber 77 is communicated to the fluid chamber 73 behind the pump shaft 17a through a fluid passage 78 in the rear cover 64 and through a fluid passage 79 in the side wall 11a so that the brake is kept in its non-operated condition during the time when fluid pressure is supplied to the fluid chamber 73, namely when the PTO clutch 66 is engaged.

As shown in FIGS. 3 to 5, opening 24 in the side wall 11a of the transmission casing 11 is formed such that it extends almost all over the side wall 11a. The side cover 25 is secured to the wall 11a using bolts 80 and includes a bearing-retaining portion 81A for a bearing 81 which receives one end of the reduction shaft 20, another bearing-retaining portion 82A for a bearing 82 which receives an inner side portion of the rear wheel axle 12 of one side, a mounting boss portion 83A for securing an axle casing 83 for the axle 12 set forth above, and a receiving bore 84 for supporting one of the support shafts 23a of the swash plate 23. The support shafts 23a and 23b shown are formed integrally with the swash plate 23, and one support shaft 23a is fittingly received in the bore 84 through a bearing sleeve 85 whereas the other support shaft 23b is fittingly received in a receiving bore 86, formed in the side wall 11b of the opposite side, through a bearing sleeve 87. The former support shaft 23a extends outwardly from the side cover 25 and includes an outer end portion having a pair of flattend cut-outs on which a hollow control shaft 88 shown in FIG. 5 is fixedly mounted. The control shaft 88 is rotationally displaced using a change lever (not shown) so as to tilt the swash plate 23.

As shown in FIGS. 4 to 7, the spring mechanism 26 set forth before comprises a torque spring 92 wound around a support pin 91 which is fittingly received at both ends of it in circular bores 89 and 90 formed respectively in the outer surface of the side wall 11a and in the inner surface of the side cover 25. This spring 92 includes free end portions 92a and 92b which extend forwardly from the pin 91. A pin 93 is supported by the side cover 25 so as to project laterally inwardly from the inner surface of the cover 25, and another pin 94 is secured to the swash plate 23 so as to extend parallel to the pin 93 with a small interval therebetween. As shown in FIG. 5, the free end portions 92a and 92b of the torque spring 92 are arranged such that they once cross with each other and, then, one of the free end portions 92a engages the pins 93 and 94 from an upper direction while the other free end portion 92b engages the pins 93 and 94 from a lower direction. By this, when an operating force applied to the support shaft 23a is released, the swash plate 23 is returned automatically to its neutral position by the biasing force of torque spring 92. As shown in FIG. 4, the pin 93 is supported at its eccentric pin portion 93a by the side cover 25 so that the position of this pin 93 may be adjusted in a forward and backward direction by its rotational displacement about the axis of the pin portion 93a whereby the neutral position of swash plate 23 determined by the spring mechanism 26 may be adjusted.

The side cover 25 is also used, as shown in FIG. 4, for providing a cylindrical portion 95 for accomodating the brake-actuating spring 76. Further, this side cover 25 is used for forming fluid passages in a fashion which will be detailed hereinafter.

As shown in FIG. 5, a filter 96 for purifying oil supplied from a sump, provided by a lower space within the transmission casing 11, to the charge pump 60 is fixedly disposed on an outer surface of the front wall of the transmission casing and below the plate member 15. A lower portion of the front wall of the transmission casing 11 includes in it fluid passages 97 for connecting between the sump and filter 96 and also a fluid passage 98 for purified oil flowing out from the filter 96. The latter fluid passage 98 opens at an elongated recess 99 which is formed in a front surface of the side wall 11a of the transmission casing 11 and extends generally along a vertical direction. This recess 99 is arranged so that it is sealed by an inner surface of the side cover 25, when this cover is secured to the side wall 11a, whereby a fluid passage for leading oil from the filter 96 to the charge pump 60 of an upper position is provided by the recess 99. The recess 99 is communicated at its upper end to an inlet port (not shown) of the charge pump 60 through a fluid passage 100 in the front wall of the transmission casing 11 and through another fluid passage 101 in the plate member 15.

Figure 7:
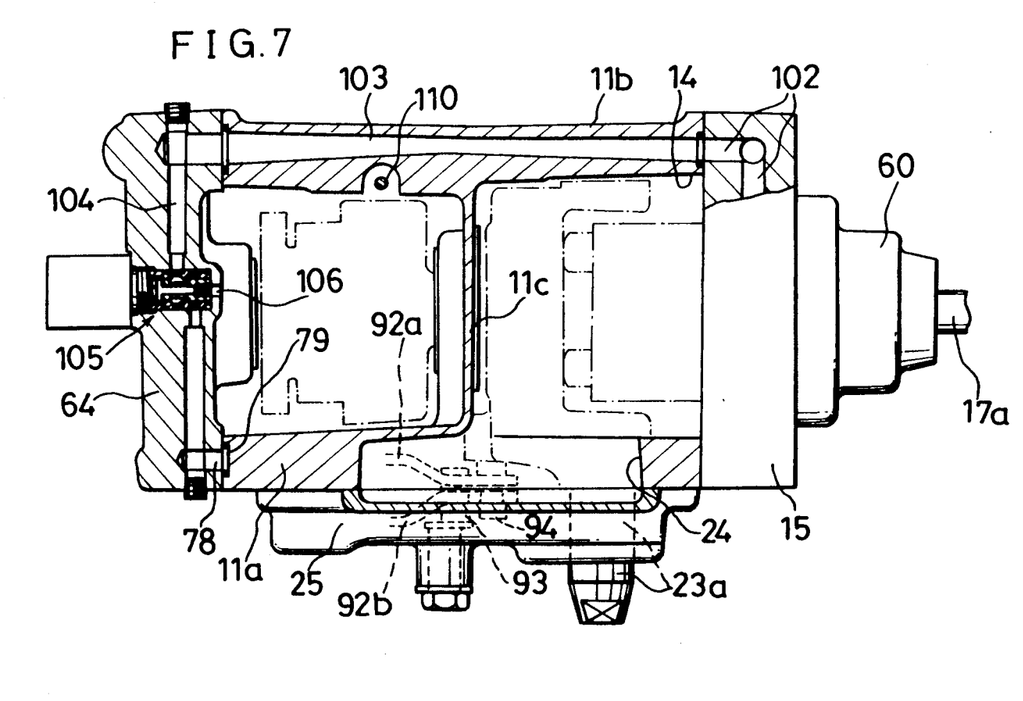
FIG. 7 is a sectional view taken generally along line VII—VII of FIG. 3.

As shown in FIG. 7, a fluid passage 102 communicated to an outlet port (not shown) of the charge pump 60 is formed in the plate member 15 and is communicated to a fluid passage 104 in the rear cover 64 through a fluid passage 103 formed in the side wall 11b of the transmission casing 11. The fluid passage 104 is connected to the fluid chamber 73 shown in FIGS. 1 and 4 through an electromagnetic control valve 105 which is displaced selectively to a position, where fluid is flowed into the fluid chamber 73 so as to engage the PTO clutch 66, and to another position where fluid is returned to the inside of transmission casing 11 through a drain passage 106 in the rear cover 64 so as to disengage the PTO clutch 66.

Although not shown in the drawings, the plate member 15 also includes a pair of connecting fluid passages for connecting between inlet and outlet ports formed in the valve plates 57 and 39 for the hydraulic pump 17 and motor 18, a pair of fluid-supplementing passages for supplementing fluid from the charge pump 60 to the pair of connecting fluid passages set forth above, and valves for the hydrostatic transmission 16 such as check valves and relief valves.

The plate member 15 is fastened to the front of the transmission casing 11 using bolts 108, as shown in FIG. 4. The casing 18b for the hydraulic motor 18 is fastened to the front of the plate member 15 using lengthy bolts 109 which also fasten the plate member 15 to the transmission casing, as shown in FIG. 1. In FIG. 7, numeral 110 designates an oil level-detecting bar which is supported by the top wall of the transmission casing for detecting oil level in the casing 11.

In assembling, the swash plate 23 shown in FIGS. 1, 3 and 4 may be assembled into the transmission casing 11 together with the reduction shaft 20 and one of the wheel axles 12 which are previously supported together with the swash plate by the side cover 25. In the embodiment shown, this assembling procedure is carried out prior to the assembling procedure for the cylinder block 21 previously supported by the plate member 15 because, as shown in FIG. 4, the support shafts 23a and 23b of swash plate 23 are disposed so that they are overlapped with the cylinder block 21 as viewed in a forward and backward direction. Assembling of the PTO clutch 66 onto the pump shaft 17a and assembling of gear mechanism between the pump shaft 17a and mid-PTO shaft 34 into the transmission casing 11 are performed at a condition where the rear cover 64 is detached from the transmission casing.

FIG. 8 depicts another embodiment in which a spring mechanism 126 for returning the swash plate 23 to its neutral position is provided using one of the support shaft 23a of the swash plate as a support in a fashion described before. The spring mechanism 126 includes a torque spring 92 wound around the support shaft 23a. Free ends 92a and 92b of this torque spring 92 extend rearwardly from the support shaft 23a and respectively engage pins 94 and 93, similar to those employed in the previous embodiment, from an upper direction and from a lower direction. In the embodiment shown in FIG. 8, brake shoe 74 for braking the gear 67 is attached to the piston-piston rod 75. A clutch housing of the PTO clutch 66 is formed integrally with gear 67, and a rotatable support member 171 is fixedly mounted on the pump shaft 17a for supporting frictional elements of driving side of the PTO clutch 66.

The mower tractor shown is used for a mowing operation by means of mower M with changing the vehicle speed indefinitely and with a selective reverse of travelling direction by a control of the swash plate 23. When an operating force for the swash plate 23 is released by an operator at an emergency or the like, the swash plate is returned to its neutral positon automatically by the spring mechanism 26 or 126 so that the vehicle is stopped. Brake having the brake shoe 74 will stop quickly, after the PTO clutch 66 has been disengaged, an inertial rotation of the driven side of this clutch.

I claim:

1. In a vehicle transmission assembly wherein axles of left and right rear wheels are supported rotatably by a transmission casing disposed between said left and right rear wheels, and wherein a hydrostatic transmission for changing the vehicle speed non-stepwisely is provided using, as a support, a plate member which is secured to a front of said transmission casing so as to close an opening in a front wall of said casing, said hydrostatic transmission having a hydraulic pump and a hydraulic motor which are disposed respectively on said plate member such that said hydraulic pump is positioned at a higher level than said hydraulic motor, the improvement characterized in:

that said hydraulic motor (18) is disposed on a front of said plate member (15) and includes a motor shaft (18a) drivingly connected through a speed-reducing bevel gearing (19) to a speed-reduction shaft (20) which is disposed within said transmission casing (11) and extends laterally of said casing, said left and right rear wheel axles (12) being drivenly connected to said speed-reduction shaft;

that said hydraulic pump (17) is disposed within said transmission casing (11) and is fashioned to an axial plunger-type pump which includes a pump shaft (17a) supported rotatably by said plate member (15), a cylinder block (21) disposed on a rear of said plate member and fixedly mounted on said pump shaft, plural plungers (22) slidably disposed in said cylinder block and extending rearwardly from said block, and a tiltable swash plate (23) disposed rearwardly of said cylinder block, said plungers engaging said swash plate; and that a second opening (24) is formed in one of side walls (11a) of said transmission casing (11) for assembling a transmission mechanism to be disposed between said speed-reduction shaft (20) and said left and right rear wheel axles (12) such that said second opening extends upwardly so as to permit to assemble said swash plate (23) into said transmission casing through said second opening, left and right support shafts (23a, 23b) of said swash plate being rotatably supported by the other side wall (11b) of said transmission casing and by a side cover (25) which is secured to an outer surface of said one side wall (11a) so as to close said second opening.

2. A vehicle transmission assembly as set forth in claim 1, wherein a spring mechanism (26) for returning said swash plate (23) to a neutral position is disposed within said transmission casing (11) and is supported by said one side wall (11a) and by said side cover (25).

3. A vehicle transmission assembly as set forth in claim 1, wherein a spring mechanism (126) for returning said swash plate (23) to a neutral position is disposed within said transmission casing (11) and is supported by a portion of one of said support shafts (23a), said portion of said one support shaft being located between said swash plate and said side cover (25).

* * * * *